United States Patent
Lesci et al.

(10) Patent No.: US 9,782,808 B1
(45) Date of Patent: Oct. 10, 2017

(54) ACCELERATED PROCESS FOR THE DESTRUCTION OF ASBESTOS-CONTAINING MATERIALS

(71) Applicants: Isidoro Giorgio Lesci, Castel Bolognese (IT); Tullia Zucca, Comazzo (IT); Paolo Tuccitto, Poppi (IT); Bruno Vaccari, Rome (IT); Alberto Di Loreto, Rome (IT); Mauro Casadei, Maranzana (IT)

(72) Inventors: Isidoro Giorgio Lesci, Castel Bolognese (IT); Tullia Zucca, Comazzo (IT); Paolo Tuccitto, Poppi (IT); Bruno Vaccari, Rome (IT); Alberto Di Loreto, Rome (IT); Mauro Casadei, Maranzana (IT)

( * ) Notice: Subject to any disclaimer, the term of this patent is extended or adjusted under 35 U.S.C. 154(b) by 0 days.

(21) Appl. No.: 15/299,398

(22) Filed: Oct. 20, 2016

Related U.S. Application Data

(60) Provisional application No. 62/320,934, filed on Apr. 11, 2016.

(51) Int. Cl.
| | | |
|---|---|---|
| *A62D 3/02* | (2007.01) | |
| *B09B 3/00* | (2006.01) | |
| *A62D 3/36* | (2007.01) | |
| *A62D 3/20* | (2007.01) | |
| *A62D 3/10* | (2007.01) | |
| *A62D 101/41* | (2007.01) | |

(52) U.S. Cl.
CPC .............. *B09B 3/0066* (2013.01); *A62D 3/02* (2013.01); *A62D 3/10* (2013.01); *A62D 3/20* (2013.01); *A62D 3/36* (2013.01); *A62D 2101/41* (2013.01); *A62D 2203/02* (2013.01)

(58) Field of Classification Search
CPC ... A62D 3/02; A62D 3/10; A62D 3/20; A62D 3/36; B09B 3/0066
USPC .......................................................... 588/411
See application file for complete search history.

(56) References Cited

U.S. PATENT DOCUMENTS

2003/0146310 A1* 8/2003 Jackson ................... A62D 3/19
239/690

\* cited by examiner

*Primary Examiner* — Edward Johnson
(74) *Attorney, Agent, or Firm* — H. John Rizvi; Gold & Rizvi, P.A.

(57) ABSTRACT

A process for the destruction of asbestos-containing materials includes forming an asbestos slurry or suspension of the asbestos-containing materials by applying an acid treatment to the asbestos-containing materials, the acid treatment causing asbestos-disrupting chemical reactions in the slurry. Simultaneously to the chemical reactions, the asbestos slurry or suspension is subjected to hydrodynamic cavitation, accelerating the chemical reactions taking place in the slurry due to the presence of acid. The asbestos-containing materials are preferably ground and polarized prior to the acid treatment. In addition, the asbestos slurry is preferably subjected to hydrothermal treatment, after which reusable, non-hazardous secondary raw materials can be recovered from the asbestos slurry.

20 Claims, 2 Drawing Sheets

ACCELERATED PROCESS FOR THE DESTRUCTION OF ASBESTOS-CONTAINING MATERIALS

CROSS-REFERENCE TO RELATED APPLICATIONS

This application claims the benefit of U.S. Provisional Patent Application Ser. No. 62/320,934, filed Apr. 11, 2016, which is incorporated by reference herein in its entirety.

FIELD OF THE INVENTION

The present invention generally relates to processes for the treatment of asbestos-containing materials (ACMs). More particularly, the present invention relates to an accelerated process for the destruction of asbestos-containing materials (ACMs) using synergistic physical and chemical treatments, and for the recovery of inert secondary raw materials (SRMs) that are non-hazardous to human health and the environment.

BACKGROUND OF THE INVENTION

Asbestos is a fibrous material which includes mineral silicates having a markedly fibrous asbestiform mineral growth habit and belonging to the amphibole or serpentine families. The mineral silicates are made up of incombustible, chemically-resistant, inert, phono-absorbing, flexible and tensile fibers. Asbestos mineral deposits can be found throughout the world and are still mined in Australia, Canada, South Africa and the former Soviet Union.

The chemical and physical properties of asbestos, namely its heat resistance, tensile strength and insulating properties, have rendered it one of the most important inorganic materials for industrial uses and technological applications. Asbestos minerals have been used in the construction of building materials such as cement products, acoustic and thermal sprays, pipe and boiler wraps, flooring and roofing materials, plasters, paints and many others.

Asbestos is characterized by a crystal formation of long, thin fibers, which makes asbestos quite different from other materials. Based upon its crystalline structure, asbestos may be classified as either serpentine or amphibole.

Serpentine asbestos has a sheet or layered structure. Serpentine minerals are usually associated with ultramafic Mg-rich rocks such as altered basalt which have been changed at different temperatures and in the presence of water in an alteration process known as serpentinization. The only member of the serpentine group, chrysotile, also known as "white asbestos", is the most common type of asbestos found in buildings and is the predominant fibrous form of serpentine. Chrysotile is a fibrous mineral which does not burn or rot, is resistant to most chemicals, is flexible and possesses high tensile strength. This unique combination of properties makes chrysotile ideal as a major component of lightweight reinforced cement products, friction materials, high temperature seals, gaskets and a host of other materials. Chrysotile has been known for over 2000 years, being used initially for cremation cloths, oil lamp wicks and other textiles. In the 19th Century, chrysotile was first mined commercially in the Urals (Russia), Italy and Canada. Although it is the least abundant of the three traditional serpentine minerals, chrysotile accounts for some 95% of world asbestos production, and hence, is of key importance when the health effects of serpentine dust are considered. Chrysotile makes up approximately 90 to 95% of all asbestos used in buildings in the United States.

Amphibole asbestos, in turn, has a chain-like structure. There are five types of asbestos in the amphibole group: (1) amosite, which is the second most prevalent type of asbestos found in building materials and is also known as "brown asbestos"; (2) crocidolite, or "blue asbestos," which is used in specialized high-temperature applications; (3) anthophyllite; (4) tremolite; and (5) actinolite. Anthophyllite, tremolite and actinolite are rare and are mainly present as contaminants in other minerals.

The amphibole group of minerals that include crystalline asbestos is based on the double-chain silicate tetrahedral structure which is cross-linked with bridging cations including magnesium, iron, calcium and sodium. The basic structural unit of amphiboles is $(Si_4O_{11})^{-6}$. The empirical formula of amphiboles can be written as:

$$W_{0-1} X_2 Y_5 Z_8 O_{22} (OH,F)_2$$

where $W=Na^{+1}$ or $K^{+1}$ in the A site with 10 to 12 fold coordination; $X=Ca^{+2}$, $Na^{+1}$, $Mn^{+2}$, $Fe^{+2}$, $Mg^{+2}$, $Fe^{+3}$, in an M4 site with 6 to 8 fold coordination; $Y=Mn^{+2}$, $Fe^{-2}$, $Mg^{+2}$, $Fe^{+3}$, $Al^{+3}$ or $Ti^{+4}$ in an M1 octahedral coordination site; and $Z=Si^{+4}$ and $Al^{+3}$ in the tetrahedral site.

The empirical formula of crocidolite (riebeckite asbestos) can be written as $Na_2 (Fe^{2+},Mg)_3 Fe^{3+}_2 Si_8 O_{22} (OH)_2$. Iron can be partially substituted with $Mg^{2+}$ within the crocidolite structure. Crocidolite fiber bundles typically easily disperse into fibers that are shorter and thinner than other amphibole asbestos fibers which are similarly dispersed. However, crocidolite fibrils are generally not as small in diameter as chrysotile fibrils. In comparison with other amphiboles or chrysotile, crocidolite has a relatively poor resistance to heat. Its fibers, instead, are used extensively in applications requiring good resistance to acids. Crocidolite fibers have fair to good flexibility, fair spinnability, and a texture ranging from soft to harsh.

In amosite (grunerite asbestos), the $Fe^{2+}$ to $Mg^{2+}$ ratio varies, but is usually about 5.5:1.5. Amosite fibrils are generally larger than crocidolite fibrils, but are smaller than particles of anthophyllite asbestos similarly comminuted. Amosite fibrils typically have straight edges and characteristic right-angle fiber axis terminations.

Anthophyllite asbestos is a relatively rare, fibrous, orthorhombic, magnesium-iron amphibole, which occasionally occurs as a contaminant in talc deposits. Anthophyllite fibrils are typically more massive than those of other common forms of asbestos.

Finally, tremolite asbestos (a monoclinic calcium-magnesium amphibole) and actinolite asbestos (an iron-substituted derivative of tremolite asbestos) rarely occur in the asbestos habit and yet are common as contaminants of other asbestos deposits. Actinolite asbestos occurs as a contaminant fiber in amosite deposits, whereas tremolite asbestos occurs as a contaminant of both chrysotile and talc deposits. Tremolite asbestos fibrils range in size but may approach the dimensions of crocidolite and amosite fibrils.

The mechanisms of amphibole breakage are important biologically with regard to resultant particle number, surface area and general respirability (all of which control penetration to target cells and delivered dose), and also with regard to expressed chemical information contained on the fiber surface.

In nature, asbestos samples usually contain different cations from those used to describe the double-layer structure. $Al^{+3}$ and $Fe^{+3}$ may substitute for $Si^{+4}$, and $Fe^{+2}$, $Fe^{+3}$, $Mn^{+2}$ and $Ni^{+2}$ can all substitute for $Mg^{+2}$ to a greater or lesser degree. These substitutions may be summarized in a chemical formula written as:

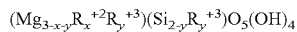

where $R^{+2}=Fe^{+2}$, $M^{n+2}$ or $Ni^{+2}$ and $R^{+3}=Al^{+3}$ or $Fe^{+3}$.

Normally, asbestos-containing materials (ACMs) in buildings do not pose a hazard to occupants and workers in those buildings except when asbestos fibers become airborne and are inhaled. In other words, intact, undisturbed asbestos-containing materials generally do not pose a health risk. It is when the asbestos-containing materials are damaged, disturbed or deteriorated over time that the asbestos-containing materials release asbestos fibers into the air inside the buildings and may become hazardous and pose an increased risk. As a toxic substance and known carcinogen, asbestos can cause several serious diseases in humans. Symptoms of these diseases typically develop over a period of years following asbestos exposure.

Because it has been unquestionably linked to lung cancer, asbestosis and pleural mesothelioma, asbestos is now considered to be a human health hazard. Furthermore, the use of asbestos is currently forbidden in several technologically-advanced countries.

Each country may set its own standards as to the definition of a hazardous or dangerous asbestos-containing material. For instance, the Environmental Protection Agency (EPA) in the U.S. classifies any material containing more than 1 wt % asbestos as an asbestos-containing material (ACM); a similar classification is defined in Italy by D.L. 277, 15/8/1991.

Asbestos-containing materials can be basically divided into friable and compact asbestos materials. Friable asbestos designates any asbestos-containing material that can be easily crumbled or powdered when dry, and is normally composed of 70 to 95 wt % asbestos fibers. In general, friable asbestos in building materials can be found in artificial ashes and embers for gas-fired fireplaces, cavities, partitions of floors and ceilings, insulation of electrical wires, and insulation of panels, etc. In turn, compact asbestos designates an asbestos-containing material consisting in a composite material in which asbestos fibers are embedded in a cement or polymeric matrix. Compact asbestos is not prone to release fibers unless it is sawed or scratched by mechanical tools. In general, compact asbestos in building materials can be found in bonding and finishing cements, masonry fillers, mortars, mastics, asbestos-cement products having generally 4 to 15 wt % chrysotile asbestos and/or 0 to 6 wt % amphibole asbestos, etc.

A number of methods, some of which are patented, have been proposed to destroy or disrupt the molecular structure of asbestos and render asbestos less harmful to human health. The main processes used to transform asbestos into inert materials have been traditionally based on chemical treatment (typically by applying acid), thermal treatment and mechanochemical treatment. More recently, methods using a biochemical and microbiological approach have been developed.

Regarding acid-based chemical treatments, various methodologies that include the use of organic or mineral acids have been developed for the transformation of asbestos-containing materials and the rendering of secondary, recyclable and often reusable materials. In particular, mineral acids such as hydrofluoric acid, hydrochloric acid and sulfuric acid, as well as organic acids such as formic acid and oxalic acid, have been used to treat asbestos.

Regarding thermal treatments, it is well-known that dehydroxylation of chrysotile asbestos occurs in the range 650 to 750° C. It is also known that, at around 1000° C., the fibrous structure of chrysotile asbestos becomes loose and a new crystalline structure (forsterite and/or enstatite) is formed. Further, amphiboles such as crocidolite asbestos decompose at around 1050 to 1100° C. through a complex reaction path involving iron oxidation, which leads to formation of pyroxene, enstatite, hematite and cristobalite. Tremolite asbestos, in turn, decomposes into diopside, enstatite and cristobalite.

Vitrification is one of the most effective thermal processes for treatment of asbestos. The benefit of vitrification derives from the complete destruction of the fibrous structure and the formation of a glass-forming mixture which can be recycled as secondary glass material, due to the fact that asbestos-containing materials do not contain heavy metals. For instance, in the INERTAM-Europlasma process, vitrification of asbestos-containing materials is carried in a cylindrical furnace by a plasma torch at 1600° C. This is currently the only method of conversion of asbestos-containing materials that has been successfully adapted from a lab scale to a fixed, large-scale industrial plant. However, the process costs for rendering asbestos inert using this plasma-torch-based large-scale industrial process are, unfortunately, prohibitively high.

As to the biochemical and microbiological processes for treating asbestos, the best existing process known nowadays comprises the disintegration of the crystal planes of brucite (oxygen-magnesium) which are present within the crystalline planes of chrysotile as an indirect effect of metabolism of the bacterial cultures. Due to the presence of metabolites secreted by bacteria, decomposition of the crystal planes appears to be caused by acidification of the reaction environment. The process includes the steps of preparing an acid liquid/suspension by subjecting a food industry waste material to mixed bacterial and fungal growth and/or fermentation and treating the asbestos-containing materials with the acid solution/suspension obtained from the mixed fermentation at a temperature of 120 to 170° C. and a pressure of 2 to 10 bar. While this process may be effective, it requires from half a day to several days for completion, and is thus not sufficiently productive.

Accordingly, there remains a need for a method of destroying asbestos-containing materials (ACMs) that is not only applicable in large-scale industry, but also productive and non-hazardous to human health and the environment.

SUMMARY OF THE INVENTION

The present invention is directed to a method for destroying asbestos-containing materials (ACMs) that is not only able to provide an accelerated and complete destruction of the asbestos-containing materials but can also generate resulting inert secondary raw materials (SRM) that are usable, marketable and non-hazardous to human health and the environment. The asbestos-containing materials treated in the processes of the invention may include both friable and compact matrix materials such as cement, polymer, mortar, and vinyl, and may contain asbestos in fibril form or in alternative forms. The process includes a synergistic combination of physical and chemical processes which is capable of accelerating the dissociation of the asbestos-containing materials to allow the subsequent destruction of asbestos fibers contained in the materials. This destruction splits the asbestos in the elements that compose it, and thus yields usable and marketable metals and chemicals.

Under optimal conditions, the synergistic process of the invention can successfully carry out a complete denaturation of asbestos-containing materials in about 15 minutes to 3 hours. The invention thus provides a significant process time reduction in comparison to conventional denaturation processes, the best of which require more than half a day and are not replicable in a secure manner outside a laboratory setting.

In a first implementation of the invention, a process for the destruction of asbestos-containing materials comprises a step of forming a slurry or suspension by applying at least one acid to the asbestos-containing materials, and subjecting the slurry or suspension to a hydrodynamic cavitation. Cavitation of the slurry intensifies and accelerates the chemical reactions taking place in the slurry and significantly reduces the total asbestos destruction process time.

In a second aspect, the process can further include a step of grinding the asbestos-containing materials to obtain asbestos-containing particles, prior to the step of forming a slurry or suspension, to increase the surface react area of the asbestos-containing materials and thus increase their reactivity to the at least one acid. For instance, the asbestos-containing particles can have a size of about 0.1 to 100 millimeters.

In another aspect, the process can further include a step of polarizing the asbestos-containing particles. The step of polarizing the asbestos-containing particles can include subjecting the asbestos-containing particles to a cold plasma torch, and preferably to a cold atmospheric pressure plasma torch.

In another aspect, the step of forming a slurry or suspension by applying at least one acid can include combining the asbestos-containing materials with an acid solution. The acid solution can have a pH in the range of from 0 to 6, for instance and without limitation.

In another aspect, the acid solution can include inorganic and/or organic acid, which can optionally be obtained from a waste liquid originated in a separate industrial process. The waste acid can be optionally acidified. Selected genetically modified microorganisms can optionally be added to acidify the waste liquid. The genetically modified microorganisms can be selected to react with slurry components and to demolish the molecular structure of the slurry components.

In another aspect, the process can further include a step of applying a hydrothermal treatment to the slurry or suspension, after the step of subjecting the slurry or suspension to cavitation. For instance and without limitation, the hydrothermal treatment may be carried out in a hydrothermal reactor at a temperature of about 50 to 300° C. and with an internal pressure from 1 to 60 atm.

In another aspect, the process can further include a step of recovering at least one inert, secondary raw material from the slurry or suspension, after the step of applying a hydrothermal treatment to the slurry or suspension, the at least one secondary raw material including at least one of a liquid, a solid and a gaseous material.

In another aspect, the asbestos-containing materials can include at least one of a friable or compact matrix material such as cement, concrete, gypsum, vinyl or a combination thereof.

In another aspect, the asbestos-containing materials can include natural rock containing asbestos, such as ophiolites.

In another aspect, the asbestos-containing materials can include any one of serpentine asbestos and amphibole asbestos.

In another implementation of the invention, a method for the destruction of asbestos-containing materials includes a step of forming a slurry or suspension by applying at least one acid to the asbestos-containing materials. The slurry or suspension is subjected to hydrodynamic cavitation. A hydrothermal treatment is applied to the slurry or suspension, after the step of subjecting the slurry or suspension to cavitation, to produce at least one inert, secondary raw material.

In yet another implementation of the invention, a method for the destruction of asbestos-containing materials comprises the steps of grinding the asbestos-containing materials to obtain asbestos-containing particles of preferably about 0.1 to 100 millimeters, and polarizing the asbestos-containing particles, preferably by a cold plasma torch. Next, a slurry or suspension is formed by applying at least one acid to the asbestos-containing particles, the at least one acid reacting chemically with the asbestos-containing particles to dissociate and disrupt the slurry components. Simultaneously to the reacting of the acid with the asbestos-containing particles, the slurry or suspension is subjected to hydrodynamic cavitation, the cavitation accelerating and intensifying the chemical reactions. A hydrothermal treatment can then be applied to the slurry or suspension, wherein the hydrothermal treatment is carried out in a hydrothermal reactor at a temperature of 50 to 300° C. and with an internal pressure from 1 to 60 atm. At least one inert liquid, solid or gaseous secondary raw material is recovered after the step of applying a hydrothermal treatment to the slurry or suspension.

In another implementation of the invention, a process for the destruction of asbestos-containing materials comprises a step of grinding the asbestos-containing materials into asbestos-containing particles of about 0.1 to 100 millimeters. The asbestos-containing particles are then subjected to a cold plasma torch and polarized. Next, an acid solution containing at least one acid is applied to the asbestos-containing particles to form a slurry in which chemical reactions take place that dissociate and disrupting the slurry components. While the chemical reactions take place, the slurry is subjected to cavitation, the cavitation accelerating and intensifying the chemical reactions. A hydrothermal treatment can be applied to the slurry to then obtain resulting products including at least one of an inert or chemically inactive liquid, solid and gaseous product.

In yet another implementation of the invention, a process to definitely destroy friable or compact asbestos-containing materials includes the steps of: grinding and polarizing waste asbestos-containing materials; preparing a suspension including the asbestos-containing materials and at least one acid, the at least one acid optionally comprised in a waste liquid which optionally further includes genetically modified microorganisms; treating the suspension of the asbestos-containing materials and at least one acid by a hydrodynamic cavitation; applying an hydrothermal treatment to the suspension and recovering products or Secondary Raw Materials (SRM) resulting from the hydrothermal treatment.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward an accelerated process for the destruction of asbestos-containing materials (ACMs) using synergistic physical and chemical treatments. As a result of the process, inert secondary raw materials (SRMs) that are non-hazardous to human health and the environment are obtained.

Figure 1:
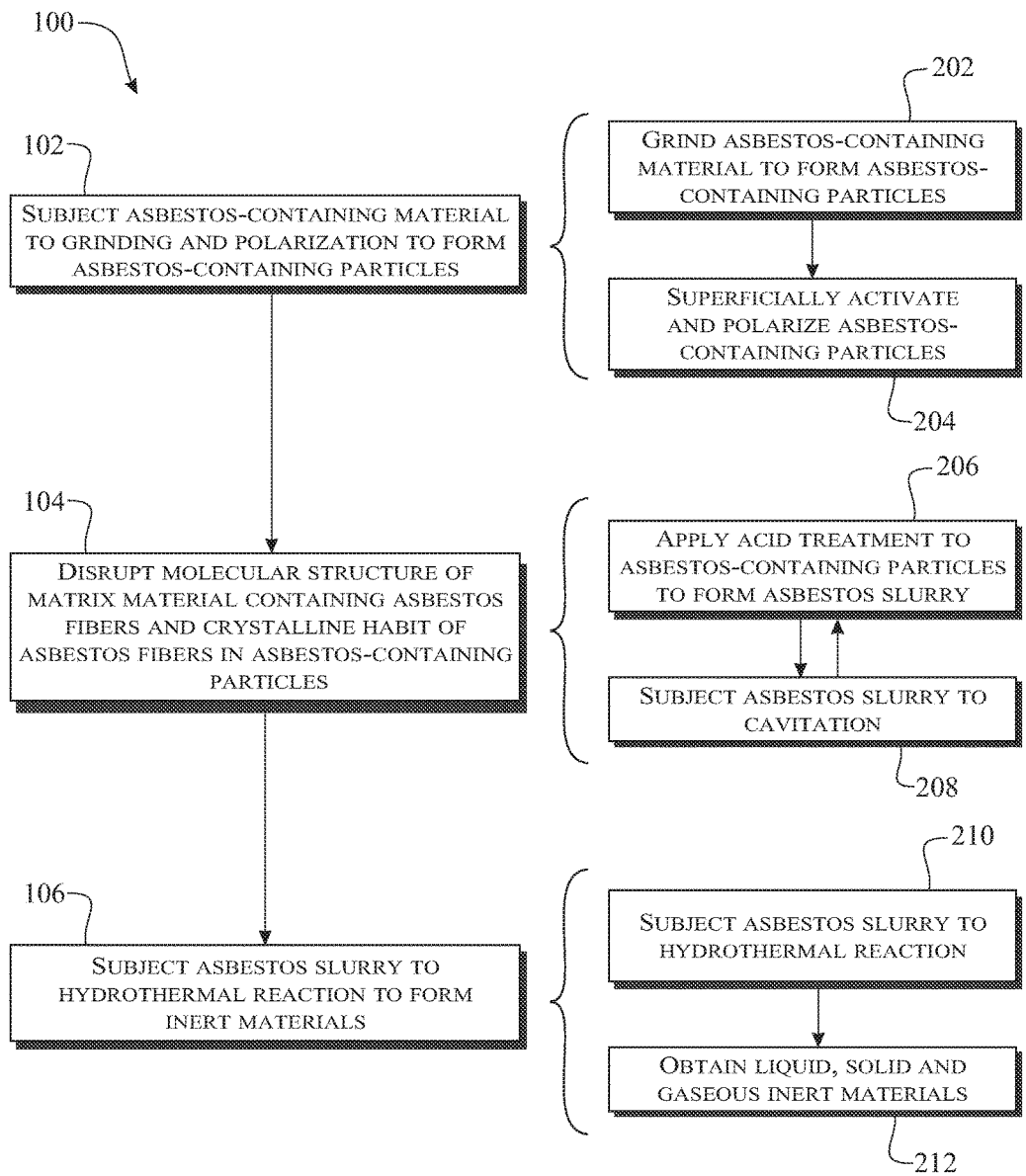
FIG. 1 presents a flow diagram of an accelerated process for the destruction of asbestos-containing materials (ACMs) using synergistic physical and chemical treatments, and for the recovery of inert secondary raw materials (SRMs) that are non-hazardous to human health and the environment.
Figure 2:
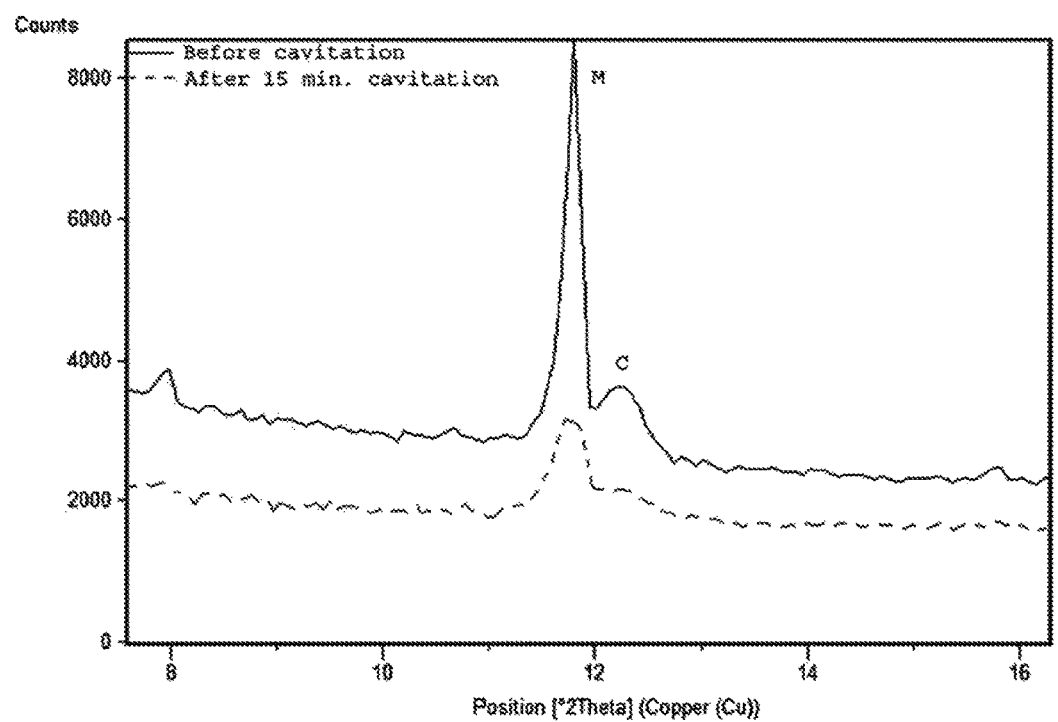
FIG. 2 presents a diffractogramm comparing the X-ray power diffraction between a starter material (cement-asbestos) and the material after 15 minutes of cavitation treatment, when carrying out an exemplary process for the destruction of asbestos-containing materials (ACMs) in accordance with the invention.

Referring to the flow diagram 100 in FIG. 1 of the drawings, an illustrative embodiment of an accelerated process for the substantially complete destruction of asbestos-containing materials (ACMs), hereinafter process 100, is illustrated. The asbestos-containing materials comprise a matrix material such as, without limitation, cement, concrete, gypsum, vinyl or a combination thereof, and asbestos fibers contained in or carried by the matrix material. The process 100 uses an innovative method to disrupt the molecular structure of both the matrix and asbestos fibers in asbestos-containing materials in a short period of time and to recycle the final product as secondary raw materials that are non-hazardous to human health and the environment. Generally, the process 100 may be carried out in three steps. At step 102, the asbestos-containing materials may initially be subjected to grinding and polarization to obtain asbestos-containing particles. At step 104, the asbestos-containing particles are treated so that molecular structure of the matrix material containing the asbestos fibers is disrupted or denatured, and the crystalline habit of the asbestos fibers in the asbestos-containing particles is disrupted or denatured. At step 106, a remaining, disrupted or denatured asbestos slurry may be subjected to a hydrothermal reaction to complete transformation of the slurry into inert materials that are non-hazardous to human health and the environment.

Step 102 of the process 100 may include sub-steps 202 and 204. At sub-step 202, the asbestos-containing material is initially ground to form asbestos-containing particles. Grinding the asbestos-containing materials to form asbestos-containing particles is helpful, for instance, in that it prepares hydrophobic components in the asbestos-containing materials (e.g. amphibole asbestos) to subsequently react in a hydrophilic environment such as an acidic aqueous solution. In preferred embodiments, the resulting asbestos-containing particles have a size of about 0.1 to 100 millimeters. Grinding is preferably carried out in vacuum or under negative pressure conditions to prevent dispersion of fibers into the environment.

At sub-step 204, the asbestos-containing particles are superficially activated and polarized by subjection to a cold plasma torch, for purposes that will be described in greater detail hereinafter. The cold plasma torch that is applied to the asbestos-containing particles is in an ionized state and contains ionized atoms, neutral molecules, electrons, ions and radicals. The cold plasma torch is preferably a non-thermal plasma torch, also known as non-equilibrium plasma torch due to the fact that the average energy of the electrons in the plasma is much greater than that of the ions and neutrals. The cold plasma torch that is applied to the asbestos-containing particles is at atmospheric pressure.

As mentioned heretofore, the asbestos-containing particles are then treated at step 104 so that cement, concrete, gypsum, vinyl or other matrix materials and the asbestos fibers contained in the asbestos-containing particles are disrupted or denatured. As shown in the figure, step 104 of the process 100 may include sub-steps 206 and 208.

At sub-step 206, disruption of the molecular structure of the matrix material which contains the asbestos fibers and disruption of the crystalline habit of the asbestos fibers in the asbestos-containing particles is carried out by applying an acid treatment to the asbestos-containing particles to form an asbestos slurry or suspension. The acid treatment is applied by combining the asbestos-containing particles with an acid solution, thus forming an asbestos-containing slurry in which the acid(s) react with the asbestos-containing particles. Having previously applied an atmospheric pressure plasma torch increases the surface energy of the asbestos-containing particles and thus allows the asbestos-containing particles to be more easily (and thus rapidly) dispersed in the acid solution, contributing to reduce the duration of the asbestos destruction process.

The acid solution may have a pH in the range of from 0 to 6, and may include at least one of sulfuric acid, sulphurous acid, hydrochloric acid, hydrofluoric acid, phosphoric acid, phosphorous acid, nitric acid, nitrous acid, acetic acid, formic acid, lactic acid, trifluoroacetic acid, and a combination thereof, for example and without limitation. At least one inorganic and/or organic acid waste liquid from a separate industrial process may be used to prepare the acid solution. For instance and without limitation, the present process 100 may utilize waste liquids from at least one of the following industries or industrial processes: the food industry; chemical surface treatment industry for the coating of metals and other materials (e.g., galvanic processes for applying a zinc coating); phosphating processes; non-ferrous hydrometallurgy; waste treatment industry; metal surface treatment by pickling; electronic cleaning processes; alkali degreasing; and metal surface treatment by anodization.

In the event that waste liquid from the food industry is used, the waste liquid may be acidified using selected genetically modified microorganisms. The genetically modified microorganisms are preferably selected to react with the asbestos-containing slurry components and disrupt the molecular structure of the matrix material and the crystalline habit of the asbestos fibers in the asbestos-containing particles. In some embodiments, the selected microorganisms can be added to the slurry within the cavitation apparatus. In other embodiments, alternatively or additionally, the selected microorganisms can be added to the slurry by feeding the slurry to a top of a separate tower containing microorganism beds. The beds can be created by treated mussel shells or other fitted supports.

Preferably, the acid treatment of the asbestos-containing particles is carried out in a hydrodynamically-controlled cavitation apparatus. A cavitation apparatus is understood to be an apparatus for applying forces on a liquid and causing cavitation in the liquid. Cavitation is a phenomenon which involves the rapid formation and implosion of bubbles in a low-pressure area in liquids by means of mechanical forces. Due to the low pressure, the liquid vaporizes, forming cavities. At the edges of each cavity, small quantities of vapor are emitted as cavitation bubbles. The process of cavitation bubble generation and the subsequent growth and collapse of the cavitation bubbles results in very high energy densities and very high local temperatures and local pressures at the surfaces of the cavitation bubbles for a very short period of time. When they collapse, the cavitation bubbles energetically force the liquid into very small volumes, thereby creating spots of high temperature and emitting shock waves throughout the liquid. This collapse of and interaction of the acoustic waves with the cavitation bubbles is known as acoustic cavitation. Conditions in the collapsing cavitation bubbles can reach 5000° C. and 1000 bar in just microseconds, parting from initial conditions of room temperature and 1 bar, respectively ("The temperature of cavitation"; Flint E B, Suslick K S; Science, 1991 Sep. 20; 253(5026): 1397-9; and "Ultrasonics: Fundamentals, Technologies, and Applications, Third Edition"; Dale Ensminger, Leonard J. Bond; CRC Press, 19 set 2011).

For instance and without limitation, the cavitation apparatus of the present disclosure can include a mechanical cavitation apparatus (e.g. a propeller or agitator), or a sonication apparatus preferably generating sound waves having a frequency or frequencies greater than 20 kHz to produce a cavitational effect in the liquid. In some embodiments, once the asbestos-containing particles are combined with an acid solution to form the slurry, the slurry can be passed through the cavitation apparatus, in order for the slurry chemical reactions to take place simultaneously to cavitation. Alternatively or additionally, acid solution can be added to the asbestos-containing particles or slurry within the cavitation.

Thus, in accordance with the process 100 disclosed herein, cavitation is carried out in the asbestos-containing slurry simultaneously to the chemical reaction taking place. In other words, with reference to FIG. 1, at sub-step 208 of step 104 the asbestos slurry is subjected to cavitation in the cavitation apparatus, and the effects of the cavitation are provided simultaneously to the chemical reactions between the acids and the asbestos-containing particles taking place in the slurry.

Simultaneous cavitation and acid based chemical reactions provide unexpected advantageous effects to the asbestos destruction process. Specifically, cavitation of the liquid-solid, slurry material causes a series of unique physical phenomena that affects the solids (i.e. the asbestos) in the liquid medium (i.e. the acid solution). Microjets and high-energy shockwaves are produced in the liquid medium, and during the collapse of a cavitation bubble, high local temperatures and pressures are generated. The shockwaves induce mechanical damage such as material erosion in nearby asbestos-containing particles in the liquid medium. The microjets induce erosion and pitting in the surface of the asbestos-containing particles. Cavitation also creates high-velocity inter-particle collisions that may alter the morphology and size of the asbestos-containing particles dramatically. The power of the shockwaves generated by the cavitation process uniformly disrupts everything in their paths. Thus, by means of cavitation, the asbestos-containing particles in the slurry are fractured into even smaller asbestos-containing particles. Smaller asbestos-containing particles result in a better dispersion and greater surface area on which the chemical reactions produced by the acids can take place.

Therefore, according to the process of the present invention, the asbestos-containing particles receive an acid treatment simultaneously to a cavitation process, so that both physical effects (cavitation to reduce the dimension of the particles, and damage the morphology and crystal structure of the asbestos fibers) and synergistic chemical effects are produced. The synergy between the cavitation and the acid treatment causes the matrix materials and asbestos-fibers to become disrupted very quickly and into smaller-sized particles.

For instance, testing has been carried out using asbestos-containing materials having a cement matrix material. It is well-known that acid decomposes cement according to the following equation:

$$2H^{+}+CaCO_3 \rightarrow Ca^{2+}+CO_2+H_2O$$

Testing has proven that, by submitting an asbestos-containing cement matrix material to simultaneous acid treatment and cavitation, the above cement decomposition reaction takes place in an extremely brief period of time. Specifically, it has been observed that the amount of cement matrix material decreases in about 50 to 80 wt % in only 1 to 15 minutes. In addition, due the synergistic cavitation and acid attack (especially in the case of chrysotile asbestos), the asbestos fibers are significantly reduced in size and the crystal structure appears notably damaged; specifically, cavitation reduces the particles of the matrix and asbestos from the macroscopic to microscopic dimension, increasing the contact area between particles and acid suspension. The physical reduction of the particles damages the crystal habit of the asbestos and chemically decreases the rate of the reaction with the acid. The diffractogramm of FIG. 2 compares the X-ray power diffraction between the starter material (cement-asbestos) and the material after 15 minutes of cavitation treatment. The diagram highlights the drastic reduction of the bands related to the chrysotile (C) and the monetite (M). The reduction of the bands is due to the destruction of crystalline structure.

In step 106, as mentioned heretofore, the remaining, disrupted or denatured asbestos slurry is subjected to a hydrothermal reaction to complete transformation of the slurry into inert materials that are non-hazardous to human health and the environment. As shown in the figure, step 106 may include sub-steps 210 and 212.

At sub-step 210, the asbestos slurry from sub-step 208 of step 104 is subjected to a hydrothermal reaction at high temperature and pressure conditions to hydrolyze and cause a dissolution of the undissolvable asbestos materials in the slurry. In some applications, the hydrothermal treatment may be carried out at a temperature of from about 50° C. to about 300° C. for a period of about 1 to 3 hours. The hydrothermal reaction may be carried out in a closed environment and by microwave, convection and/or conduction heating, for instance and without limitation. Further, in some applications, the hydrothermal reaction may cause a subcritical reaction in the slurry, the subcritical reaction including at least one of: a change in the properties of crystal materials forming the asbestos materials; a reaction affecting the thermodynamic or dynamic stability of crystalline materials driving the phase transformations; dehydration of the asbestos materials; and decomposition of the asbestos materials.

As known, the reaction rate of the dissolution of asbestos depends of the acidity, the temperature and apparent activation energy. More specifically, the rate of a dissolution may be measured as a change in concentration of a species as a function of time. The rate law for a dissolution may be given by: $J=k[C_e-C]^a[H^+]^b$ where k is the reaction rate parameter, C is the concentration of the measured species in the bulk solution, $C_e$ is the steady-state concentration to which the solution tends, and a and b are the reaction orders with respect to species C and hydrogen ion concentrations respectively. Taking logs of the equation above and keeping pH constant gives: $\log J = \log k' + a \log [C_e-C]$, where $k'=k[H^+]^b$. Taking logs of the Arrhenius equation gives $\log k' = \log A - E_A/2.303RT$, where k' is the reaction rate constant and EA is the apparent activation energy for the reaction.

The asbestos dissolution rate of the present process 100 is increased due to several causes.

In the first place, the hydrothermal reaction of the present process 100 is such that it energetically meets the dissolution of asbestos. Thus, the dissolution reaction is provided with the necessary energy for it to take place at a high rate.

In the second place, the dissolution of the asbestos material in the slurry is improved by the presence of acids, as the acids reduce the instances of an opposite reaction to dissolution. For example, the dissolution of chrysotile asbestos for pH<9 during the hydrothermal treatment is the following:

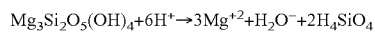

$$Mg_3Si_2O_5(OH)_4 + 6H^+ \rightarrow 3Mg^{+2} + H_2O^- + 2H_4SiO_4$$

During the hydrothermal reaction, the concentration of OH— increases logarithmically with time at room temperature, and the opposite reaction may occur. The presence of acids reduces the instances of the opposite reaction, and thus the quantity of Mg released into the solution is increased.

In the third place, an increase in the hydrothermal reaction temperature can exponentially accelerate the rate of the asbestos destruction reaction (e.g. the dissolution reaction for chrysotile asbestos indicated above), as proven by the Arrhenius equation ($d\ln k/dT = E/RT^2$, where k is the rate constant of the chemical reaction, T is the absolute temperature of the reaction, E is the activation energy, and R is the universal gas constant). In addition, the hydrothermal reaction can also be capable of changing the redox potential of the reactants.

In the fourth place, the dissolution of the asbestos material in the slurry is improved by the synergistic cavitation and acid-based chemical reaction, as the smaller-sized asbestos particles dissolve more rapidly due to the increased contact area between the smaller-sized asbestos particles and the acid suspension.

At sub-step 212, liquid, solid and gaseous inert materials are obtained or recovered. The liquid inert materials may include metals such as Fe, Al, Ni, Mn, Na, Ca, K and, especially, Mg, which in chrysotile represents about 32 wt % of its stoichiometry. These elements may be recovered as both marketable ingots and purified salts. The solid inert materials that can include no-asbestos silicate, silica, phosphate, sulfate, nitrate and micro elements (Fe, Ca, K, Mn, etc.). These solid inert materials may be suitable for preparation of solid-based fertilizers for agriculture, for example and without limitation. In turn, gaseous inert materials, such as $CO_2$, for example and without limitation, may be recovered, purified and stored or used as a reagent in the formulation of cement, paints or clinker for cement, for example and without limitation.

The process will be better understood by consideration of the following examples:

Example 1

One part of a mixture of compact cement-asbestos ACM containing both serpentine and amphibole asbestos (4 to 15 wt % of chrysotile and 1 to 6 wt % of crocidolite) was ground, then ionized by cold plasma torch, and then mixed with one part of waste acid in a waste liquid obtained from the food industry to obtain a liquid/solid asbestos slurry, the waste liquid having an acidity in the range [H3O+]=100 M to [H3O+]=10-6 M, and preferably [H3O+]=10-2 M. The asbestos slurry was subjected to a controlled cavitation process for 1 to 30 minutes. A hydrothermal reaction was then performed in order to completely disrupt the molecular structure of the asbestos. The hydrothermal reaction was carried out for 1 to 3 hours at 50 to 300° C. Heating was provided conventionally and/or using a microwave apparatus.

Example 2

One part of a compact cement-asbestos ACM containing serpentine asbestos (1 to 15 wt % of chrysotile) was ground, then ionized by cold plasma torch, and then mixed with one part of waste acid in a waste liquid obtained from the food industry to obtain a liquid/solid asbestos slurry, the waste liquid having an acidity in the range [H3O+]=100 M to [H3O+]=10-6 M, and preferably [H3O+]=10-2 M. The asbestos slurry was subjected to a controlled cavitation process for 1 to 30 minutes, followed by a hydrothermal reaction, in order to completely disrupt the molecular structure of the asbestos. The hydrothermal reaction was applied to the slurry for 1 to 3 hours at 50 to 300° C. Heating was provided conventionally and/or using a microwave apparatus.

Example 3

One part of a mixture of compact asbestos ACM containing both serpentine and amphibole asbestos (⅓ of chrysotile, ⅓ of amosite and ⅓ of crocidolite) was ground, then ionized by cold plasma torch, and then mixed with one part of waste acid in a waste liquid obtained from the food industry and having acidity in the range [H3O+]=100 M to [H3O+]=10-6 M, and preferably [H3O+]=10-2 M. The asbestos slurry was subjected to a controlled cavitation process for 1 to 30 minutes, followed by a hydrothermal reaction, in order to completely disrupt the molecular structure of the asbestos. The hydrothermal reaction was carried out for 1 to 3 hours at 50 to 300° C. Heating was provided conventionally and/or using a microwave apparatus.

Example 4

One part of a mixture of friable asbestos including both serpentine and amphibole asbestos (⅓ of chrysotile, ⅓ of amosite and ⅓ of crocidolite) was ground, then ionized by cold plasma torch, and then mixed with one part of waste acid in a waste liquid obtained from the food industry and having acidity in the range [H3O+]=100 M to [H3O+]=10-6 M, preferably [H3O+]=10-2 M. The asbestos slurry was subjected to a controlled cavitation process for 1 to 30 minutes, followed by a hydrothermal reaction, in order to completely disrupt the molecular structure of the asbestos. The hydrothermal reaction was carried out for 1 to 3 hours at 50 to 300° C. Heating was provided conventionally and/or using a microwave apparatus.

Example 5

One part of a friable and/or compact asbestos including both serpentine and amphibole asbestos was ground into asbestos-containing particles and then ionized by cold plasma torch. The asbestos-containing particles were mixed with one part of waste liquid obtained from the food industry, the waste liquid containing selected genetically modified microorganisms that acidified the waste liquid. The acidity of the asbestos slurry was in the range [H3O+]=100 M to [H3O+]=10-6 M, and preferably [H3O+]=10-2 M. The asbestos slurry was subjected to a controlled cavitation process for 1 to 30 minutes, followed by a hydrothermal reaction in order to completely disrupt the molecular structure of the asbestos. The hydrothermal reaction was carried out for 1 to 3 hours at 50° to 300° C. Heating was provided conventionally and/or using a microwave apparatus.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A process for the destruction of asbestos-containing materials, comprising:
   forming a slurry or suspension by applying at least one acid to the asbestos-containing materials; and
   subjecting the slurry or suspension to hydrodynamic cavitation.

2. The process of claim 1, further comprising a step of grinding the asbestos-containing materials to obtain asbestos-containing particles, prior to the step of forming a slurry or suspension.

3. The process of claim 2, wherein the asbestos-containing particles obtained by grinding the asbestos-containing materials are sized from 0.1 to 100 millimeters.

4. The process of claim 2, further comprising a step of polarizing the asbestos-containing particles obtained by grinding the asbestos-containing materials, prior to the step of forming a slurry or suspension.

5. The process of claim 4, wherein the step of polarizing the asbestos-containing particles comprises subjecting the asbestos-containing particles to a cold plasma torch.

6. The process of claim 1, wherein the step of forming a slurry or suspension by applying at least one acid comprises combining the asbestos-containing materials with an acid solution.

7. The process of claim 6, wherein the acid solution has a pH in the range of from 0 to 6.

8. The process of claim 6, wherein the acid solution comprises at least one inorganic acid.

9. The process of claim 6, wherein the acid solution comprises at least one organic acid.

10. The process of claim 6, wherein the acid solution comprises a waste liquid originated in a separate industrial process.

11. The process of claim 10, further comprising the step of acidifying the waste liquid.

12. The process of claim 11, wherein said step of acidifying the waste liquid comprises adding genetically modified microorganisms to the waste liquid, the microorganisms reacting with components of the slurry or suspension and demolishing the molecular structure of said components.

13. The process of claim 1, further comprising a step of applying a hydrothermal treatment to the slurry or suspension, after the step of subjecting the slurry or suspension to cavitation.

14. The process of claim 13, wherein the hydrothermal treatment is carried out in a hydrothermal reactor at a temperature of 50 to 300° C. and with an internal pressure from 1 to 60 atm.

15. The process of claim 13, further comprising a step of recovering at least one inert, secondary raw material from the slurry or suspension, after the step of applying a hydrothermal treatment to the slurry or suspension.

16. The process of claim 1, wherein the asbestos-containing materials comprise at least one of a friable or compact matrix material.

17. The process of claim 16, wherein the asbestos-containing materials comprise at least one of cement, concrete, gypsum and vinyl.

18. The process of claim 1, wherein the asbestos-containing materials comprise natural rock containing asbestos.

19. A method for the destruction of asbestos-containing materials, comprising the steps of:
   forming a slurry or suspension by applying at least one acid to the asbestos-containing materials;
   subjecting the slurry or suspension to hydrodynamic cavitation; and
   applying a hydrothermal treatment to the slurry or suspension, after the step of subjecting the slurry or suspension to cavitation, said hydrothermal treatment producing at least one inert, secondary raw material.

20. A method for the destruction of asbestos-containing materials, comprising the steps of:
   grinding the asbestos-containing materials to obtain asbestos-containing particles;
   polarizing the asbestos-containing particles;
   forming a slurry or suspension by applying at least one acid to the asbestos-containing particles, the at least one acid reacting chemically with the asbestos-containing particles;
   subjecting the slurry or suspension to hydrodynamic cavitation simultaneously to the reacting of the acid with the asbestos-containing particles;
   applying a hydrothermal treatment to the slurry or suspension, wherein the hydrothermal treatment is carried out in a hydrothermal reactor at a temperature of 50 to 300° C. and with an internal pressure from 1 to 60 atm; and
   recovering at least one inert liquid, solid or gaseous secondary raw material after the step of applying a hydrothermal treatment to the slurry or suspension.

* * * * *